Patented Aug. 29, 1950

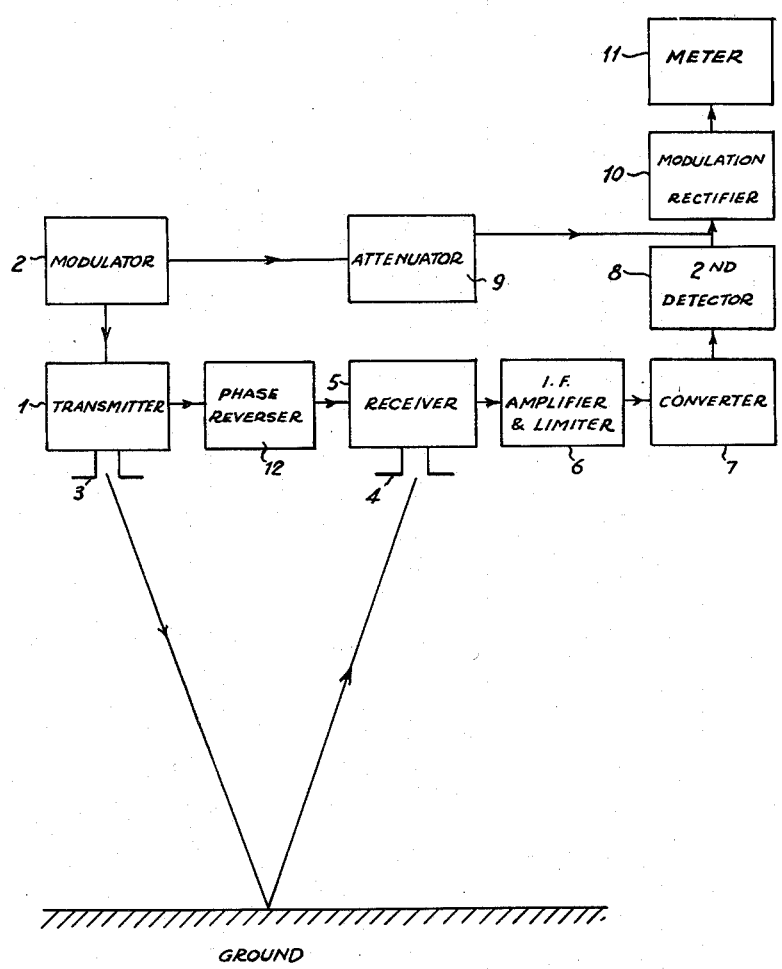

2,520,553

UNITED STATES PATENT OFFICE 2,520,553

RADIO REFLECTION DISTANCE FINDER

Dennis Illingworth Lawson, Cambridge, England, assignor to Pye Limited, Cambridge, England, a British company Application July 28, 1947, Serial No. 764,160
In Great Britain September 9, 1940

Section 1, Public Law 690, August 8, 1946
Patent expires September 9, 1960

1 Claim. (Cl. 343—14)

The present invention relates to apparatus for determining the distance of an object by means of a reflected radio wave, such as radio reflection altimeters capable of measuring the altitude of an aircraft by means of the reflection of ultra-high frequency waves from the ground, and more particularly to radio reflection altimeters for use at low altitudes.

The present invention consists in an apparatus for determining the distance of an object by means of a reflected radio wave, wherein an ultra-high frequency wave which is frequency modulated with a sinusoidal modulation of high frequency is transmitted and after reflection by the object whose distance is to be determined is received by a receiver, and wherein the received signal is limited, converted to an amplitude modulated signal and mixed with the modulation modulating the transmitter so as to produce an output current which is proportional to the phase shift of the received reflected signal relative to the transmitted signal and thus gives an indication of the distance to be determined.

From another aspect the invention consists in an apparatus for determining the distance of an object by means of a reflected radio wave, wherein an ultra-high frequency wave which is frequency modulated with a sinusoidal modulation of high frequency is transmitted and after reflection by the object whose distance is to be determined is received by a receiver, and wherein the received signal is detected and limited to a predetermined level and passes through a converter stage which converts the frequency modulation into amplitude modulation, which amplitude modulation after rectification is passed, together with some of the modulation modulating the transmitter, into a rectifier, means being provided for indicating the output from said last mentioned rectifier and thus the distance to be determined.

One embodiment of the invention as applied to a radio reflection altimeter is illustrated, by way of example, in the accompanying drawing.

The apparatus comprises an ultra-high frequency transmitter 1 which is frequency modulated with sinusoidal modulation of a high frequency from the modulator 2. The ultra-high frequency waves are transmitted from an antenna 3 directed to the ground, and the waves reflected from the ground are received on a similar receiving antenna 4 and are then passed to the first detector of a superheterodyne receiver 5.

The output from the superheterodyne receiver 5 is amplified by means of intermediate frequency amplifier and limiter 6, and the signal thus produced, limited to a predetermined level, is then passed to a converter stage 7 which converts the frequency modulation into amplitude modulation. The resultant amplitude modulated wave is then rectified by the second detector 8. This modulation is passed, together with some of the modulation modulating the transmitter, after suitable attenuation by the attenuator 9 into a rectifier 10. The output from the rectifier 10 will then depend upon the altitude of the transmitter and receiver above ground, and may be indicated on a meter 11 which may be calibrated to give a direct reading of the altitude.

The mode of operation of the apparatus may be explained as follows.

Let the modulating voltage be represented by $A \sin \omega t$ where A is the amplitude and $\omega = 2\pi \times$ modulation frequency. The modulation returned from the ground will be represented by $A \sin (\omega t + \phi)$ where $\phi$ is the phase delay of the reflected wave. A combination of these voltages gives:

$$A \sin (\omega t + \phi) - A \sin \omega t$$

$$A \sin \frac{\phi}{2} \cos \left(\omega t + \frac{\phi}{2}\right)$$

The amplitude of this voltage depends upon the phase shift $\phi$ if A is maintained constant; and this is true since the received wave is limited in the receiver. If the voltages are rectified the amplitude will be proportional to $$A \sin \frac{\phi}{2}$$

The rectified current may then be indicated on a meter which can conveniently be graduated to read altitudes.

In cases where it is necessary to place the transmitting and receiving antennae close together, the reflected signal received must be made greater than the signal which reaches the receiving antenna direct from the transmitting antenna. This is provided for by feeding some of the transmitted signal via the phase reverser 12 into the receiver 5 in opposite phase to the directly received signal until the received reflected signal at the grid of the first valve is greater than the directly received signal.

I claim:

Apparatus for determining the distance of an object by means of a reflected radio wave, comprising an ultra-high frequency transmitter, a modulator for frequency modulating the transmitter with a sinusoidal modulating signal of high frequency, means for receiving the transmitted wave after reflection by the object whose distance is to be determined, means for detecting and limiting the received frequency modulated wave, means for converting the detected and limited received wave to an amplitude modulated wave, a detector for said amplitude modulated wave, an attenuator, means for feeding the modulating signal of said modulator to said attenuator, means for feeding the detected amplitude modulated wave and the output from said attenuator to a modulation rectifier, and means for measuring the output from said modulation rectifier.

DENNIS ILLINGWORTH LAWSON.

REFERENCES CITED

The following references are of record in the file of this patent:

UNITED STATES PATENTS

| Number | Name | Date |
|---|---|---|
| 2,045,071 | Espenchied | June 23, 1936 |
| 2,055,883 | Terry | Sept. 29, 1936 |
| 2,236,893 | Chaffee | Apr. 1, 1941 |
| 2,268,643 | Crosby | Jan. 6, 1942 |
| 2,423,644 | Evans | July 8, 1947 |